(12) United States Patent
Nurminen et al.

(10) Patent No.: US 7,813,924 B2
(45) Date of Patent: Oct. 12, 2010

(54) VOICE CONVERSION TRAINING AND DATA COLLECTION

(75) Inventors: Jani K Nurminen, Lempaala (FI); Victor Popa, Tampere (FI); Elina Helander, Tampere (FI); Jilie Tian, Tampere (FI)

(73) Assignee: Nokia Corporation, Espoo (FI)

( * ) Notice: Subject to any disclaimer, the term of this patent is extended or adjusted under 35 U.S.C. 154(b) by 852 days.

(21) Appl. No.: 11/733,329

(22) Filed: Apr. 10, 2007

(65) Prior Publication Data

US 2008/0255827 A1    Oct. 16, 2008

(51) Int. Cl.
*G10L 15/20* (2006.01)
(52) U.S. Cl. .................... 704/233; 704/210; 704/215
(58) Field of Classification Search ............. 704/233, 704/208, 210, 214, 215, 226; 379/392.01
See application file for complete search history.

(56) References Cited

U.S. PATENT DOCUMENTS

| 5,630,015 | A | 5/1997 | Kane et al. |
| 6,453,041 | B1 * | 9/2002 | Eryilmaz ............... 379/392.01 |
| 6,826,306 | B1 | 11/2004 | Lewis et al. |
| 6,963,841 | B2 | 11/2005 | Handal et al. |
| 2006/0106605 | A1 | 5/2006 | Saunders et al. |
| 2006/0235685 | A1 | 10/2006 | Nurminen et al. |

OTHER PUBLICATIONS

International Preliminary Report on Patentability for PCT/IB2008/000807 dated Oct. 13, 2009.
Siu, et al., "An Unsupervised, Sequential Learning Algorithm for the Segmentation of Speech Waveforms with Multiple Speakers", IEEE, vol. 2, Mar. 23, 1992, pp. 189-192.
International Search Report and Written Opinion for PCT/IB2008/000807 dated Jun. 12, 2008.
Nedel, Jon P., "Automatic Subword Unit Refinement for Spontaneous Speech Recognition via Phone Splitting," published prior to filing of present patent applicaiton, 4 pages, 2000.
Mouchtaris, Athanasios, "Non-Parallel Training for Voice Conversion by Maximum Likelihood Constrained Adaptation," Proceedings of the IEEE International Conference on Acoustics, Speech and Signal Processing 2004, 5 pages.
Furui, Sadaoki, "Recent Advances in Spontaneous Speech Recognition and Understanding," published prior to filing of present patent application, 6 pages, 2003.

* cited by examiner

*Primary Examiner*—Huyen X. Vo
(74) *Attorney, Agent, or Firm*—Banner & Witcoff, Ltd.

(57) ABSTRACT

It may be desirable to provide a way to collect high quality speech training data without undue burden to the user. Speech training data may be collected during normal usage of a device. In this way, the collection of speech training data may be effectively transparent to the user, without the need for a distinct collection mode from the user's point of view. For example, where the device is or includes a phone (such as a cellular phone), when the user makes or receives a phone call to/from another party, speech training data may be automatically collected from one or both of the parties during the phone call.

22 Claims, 5 Drawing Sheets

| Frame | 1 | 2 | 3 | 4 | 5 | 6 | 7 | 8 |
|---|---|---|---|---|---|---|---|---|
| Training Data | 1 | 3 | 2 | 2 | 5 | 4 | 1 | 4 |

| New Data | 3 | 2 | 4 | 4 | 2 | 1 | 2 | 2 |
|---|---|---|---|---|---|---|---|---|

Fig. 6

| Training Data | 1 | 3 | 2 | 2 | 5 | 4 | 1 | 4 |
|---|---|---|---|---|---|---|---|---|
| New Data | 4 | 4 | 3 | 2 | 2 | 2 | 2 | 1 |

Fig. 7

| Training Data | 4 | 3 | 2 | 2 | 5 | 4 | 1 | 4 |
|---|---|---|---|---|---|---|---|---|
| New Data | X | 4 | 3 | 2 | 2 | 2 | 2 | 1 |

Fig. 8

| Training Data | 4 | 3 | 2 | 2 | 5 | 4 | 4 | 4 |
|---|---|---|---|---|---|---|---|---|
| New Data | X | X | 3 | 2 | 2 | 2 | 2 | 1 |

Fig. 9

| Training Data | 4 | 3 | 3 | 2 | 5 | 4 | 4 | 4 |
|---|---|---|---|---|---|---|---|---|

VOICE CONVERSION TRAINING AND DATA COLLECTION

BACKGROUND

It is known to electronically convert one voice to another. In such a voice conversion process, a training phase is performed in which speech training data from source and target speakers is collected and used to train a voice conversion model. Next, a usage phase is entered in which the trained voice conversion model is used to convert a voice.

In general, the training phase is separate and distinct from the usage phase, meaning that the user must spend time providing speech training data before being able to use the voice conversion function. The better the quality of the speech training data, the better the quality of the voice conversion model. In practice, to obtain high quality speech training data, it is typical for a user to spend quite a lot of time speaking to train the system. Typically, the user is asked to speak a set of pre-defined sentences or a large amount of free speech in a dedicated collection mode. Or the user may provide speech training data from pre-stored source recorded under controlled conditions. However, it is unreasonable and inconvenient to expect the user to speak or otherwise collect large amounts of training material for the sake of training the voice conversion model. If the source voice is generated using text-to-speech (TTS) technology, then only the target speech corpus need be collected. Nonetheless, such training remains burdensome and inconvenient to the user.

SUMMARY

It may be desirable to provide a way to collect high quality speech training data without undue burden to the user. Speech training data may be collected during normal usage of a device. In this way, the collection of speech training data may be effectively transparent to the user, without the need for a distinct collection mode from the user's point of view. For example, where the device is or includes a phone (such as a cellular phone), when the user makes or receives a phone call to/from another party, speech training data may be automatically collected from one or both of the parties during the phone call.

Illustrative aspects as disclosed herein are directed to a method, including receiving first speech input by a first party and second speech input by a second party; determining whether portions of the first speech input are active based on both the first speech input and the second speech input; generating data representing the active portions of the first speech input; and storing the data.

Further aspects are directed to an apparatus, including a first input configured to receive first speech input; a second input configured to receive second speech input different from the first speech input; a computer-readable medium; and a controller coupled to the first and second inputs and the computer-readable medium. The controller may be configured to determine whether portions of the first speech input are active based on both the first speech input and the second speech input, generate data representing the active portions of the first speech input, and store the data at the computer-readable medium.

Still further aspects are directed to an apparatus, including means for receiving first speech input by a first party and second speech input by a second party; means for determining whether portions of the first speech input are active based on both the first speech input and the second speech input; and means for generating data representing the active portions of the first speech input.

Even further aspects are directed to a method, including receiving first speech input; storing first data representing at least a portion of the first speech input; receiving second speech input; determining a first portion of the first data associated with a first speech quality; determining a first portion of the second data associated with a second speech quality; comparing the first speech quality with the second speech quality; responsive to an outcome of comparing, replacing the stored first portion of the first data with the first portion of the second speech input to produce a first modified first data; and training a voice conversion model based on the first modified first data.

Yet further aspects are directed to an apparatus, including an input configured to receive first speech input and second speech input; a computer-readable medium; and a controller coupled to the input and the computer-readable medium. The controller may be configured to store first data representing at least a portion of the first speech input at the computer-readable medium, determine a first portion of the first data associated with a first speech quality, determine a first portion of the second data associated with a second speech quality, compare the first speech quality with the second speech quality, responsive to an outcome of comparing, replace the first portion of the stored first data with the first portion of the second speech input to produce a first modified first data, and train a voice conversion model based on the first modified first data.

Yet further aspects are directed to an apparatus, including means for receiving first speech input; means for storing first data representing at least a portion of the first speech input; means for receiving second speech input; means for determining a first portion of the first data associated with a first speech quality; means for determining a first portion of the second data associated with a second speech quality; means for comparing the first speech quality with the second speech quality; means for, responsive to an outcome of comparing, replacing the stored first portion of the first data with the first portion of the second speech input to produce a first modified first data; and means for training a voice conversion model based on the first modified first data.

These and other aspects of the disclosure will be apparent upon consideration of the following detailed description of illustrative aspects. For example, illustrative systems including combinations and subcombinations of the above-mentioned apparatuses are described, as well as illustrative methods performed by these systems.

BRIEF DESCRIPTION OF THE DRAWINGS

A more complete understanding of the present disclosure may be acquired by referring to the following description in consideration of the accompanying drawings, in which like reference numbers indicate like features, and wherein:

FIGS. 6-10 show illustrative speech conversion training data in various states in accordance with the flow chart of FIG. 5.

It is noted that the various drawings are not necessarily to scale.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Except where explicitly stated otherwise, all references herein to two elements being "coupled" to each other is intended to include both (a) the elements being directly connected to each other, or in direct communication with each other, without any intervening elements as well as (b) the elements being indirectly connected to each other, or in indirect communication with each other, with one or more intervening elements.

Communication Environment

Figure 1:
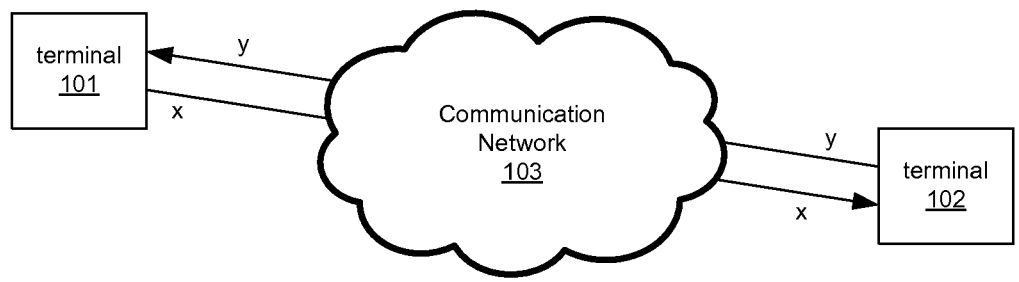
FIG. 1 is an illustrative functional block diagram of a communication environment in which a plurality of communication units communicate with one other via a communication network.

Referring to FIG. 1, an illustrative communication environment is shown in which a plurality of communication units (such as terminals 101 and 102) communicate with one another via a communication network 103. Communication network 103 may be physically embodied as any one or more communication media such as but not limited to a hard wired network, a land-based wireless network, and/or a satellite communications network. In addition, communication network 103 may be configured as any type of communication network such as but not limited to a telephone network (e.g., landline and/or cellular), the Internet, a hardwired local area network (LAN), a wireless LAN (WLAN), and/or a direct connection.

Likewise, terminals 101 and 102 may be configured to communicate with each other via communication network 130. For example, terminals 101 and 102 may include a telephone (e.g., landline and/or cellular) and/or a computer with network communication functionality. In addition, terminals 101 and 102 may be mobile units (i.e., portable wireless communication devices such as but not limited to cellular phones and walkie-talkies) or non-mobile units (e.g., desktop computers). As will be described in further detail, various aspects of speech training data collection will be illustratively described as occurring during communication between terminals 101 and 102. However, as will also be described, such collection activities may additionally or alternatively occur at other times in which a terminal is not communicating with another terminal.

Figure 2:
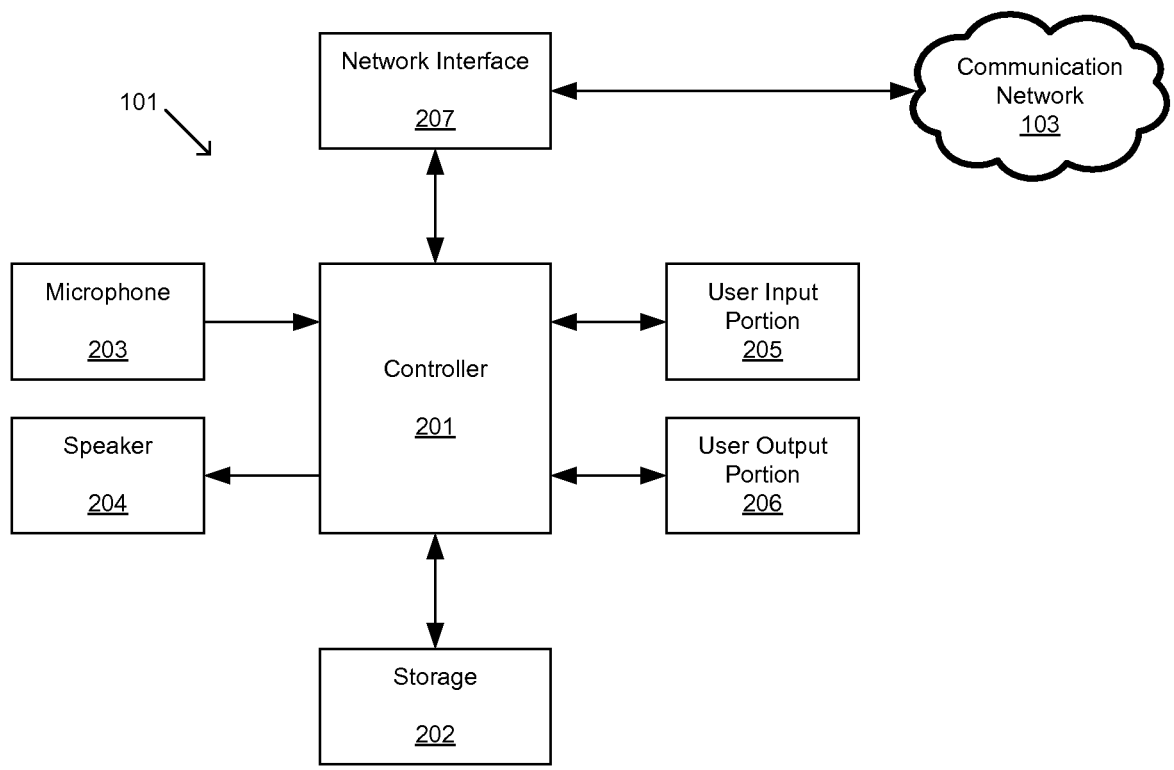
FIG. 2 is an illustrative functional block diagram of a communication unit.

FIG. 2 is an illustrative functional block diagram of terminal 101. As shown in this example, terminal 101 includes a controller 201, which in turn is directly or indirectly coupled to storage 202, a microphone 203 or other acoustic sensor, speaker 204, user input portion 205, user output portion 206, and network interface 207. Because FIG. 2 is purely a functional block diagram, it is not intended to show the physical division, layout, or connectivity of any of elements 201-207. Therefore, elements 201-207 may be physically divided in the manner shown in FIG. 2, or in any alternative manner. For instance, any one or more of elements 201-207 may be merged as a single physical unit or subdivided into multiple physical units. Moreover, any of elements 201-207 may be combined together, such as in the same housing, as a single physical device and/or divided into multiple separate physical devices. For example, microphone 203 may be coupled to, but in a physically different housing from, controller 201. Also, although FIG. 2 shows the various functions all interacting with each other via controller 201, these connections may be different. For instance, a central bus architecture may be used where various elements may communicate directly with one another without going through controller 201.

Controller 201 may be embodied as, for instance, one or more processors, circuits, computers, and the like. Controller 201 may be configurable such as by being programmed by executing computer-readable instructions stored in storage 202 and/or may be hard wired to perform specific functions. Thus, controller 201 may be embodied as hardware, software, and/or firmware. As will be discussed below, controller 201 may be configured to perform various data processing and decision-making functions of terminal 101.

Storage 202 may be embodied as one or more computer-readable media capable of storing information. For example, storage 202 may include one or more memories, magnetic disc drives/discs, and/or optical disc drives/discs. Storage 202 may store information in the form of data (such as speech training data) and/or computer-readable instructions. The computer-readable instructions may be used to configure (e.g., program) controller 201 to perform any of the various functions of controller 201 described herein. In addition, controller 201 may be configured to store data and computer-readable instructions in storage 202 as well as retrieve stored data and computer-readable instructions from storage 202 as desired.

Microphone 203 may be embodied as any acoustic sensing device, such as but not limited to a piezoelectric element microphone, a condenser microphone, a moving coil microphone. Microphone 203 may, for instance, be the microphone included on any standard cell phone. For instance, when a user is on a telephone call, the user may be talking into microphone 203. Raw analog or digital acoustic signals may be sent from microphone 203 to controller 201, or alternatively these acoustic signals may be preprocessed before being sent to controller 201.

Speaker 204 may be embodied as any sound producing device, such as but not limited to a piezoelectric element speaker or a moving coil speaker. Speaker 204 may be a physically different element than microphone 203. Alternatively, speaker 204 and microphone 203 may share the same sound sensing/producing element, since in many cases a speaker operated in reverse may be used as a microphone, and vice-versa. Speaker 204 may, for instance, be the speaker included on any standard cell phone. For instance, when a user is on a telephone call, the user may be listening to the voice of the other party being generated from speaker 204. Speaker 204 may also be used to provide a ring tone indicating an incoming call or to indicate some other status to the user. All sounds generated by speaker 204 may be directly or indirectly controlled and/or generated by controller 201.

User input portion 205 and user output portion 206 may be any devices that allow a user to provide input and receive output, respectively. For example, user input portion 205 may be a keyboard, key pad, mouse, joystick, and/or scroll wheel. User output portion 206 may be, for example, a display. Moreover, user input portion 205 and user output portion 206 may include one or more elements that are combined or integrated, such as a touch-sensitive display screen that both displays output to the user and receives touch input from the user. All user input and output may be directly or indirectly controlled by controller 201. Thus, controller 201 may cause output to be generated at user output portion 206, and controller 201 may receive input provided from user input portion 205.

Network interface 207 provides an interface between terminal 101 and communication network 103, and may be embodied as appropriate depending upon the configurations of terminal 101 and communication network 103. For example, where communication network 103 is a wireless network, then network interface 207 may include an antenna (such as a cellular network compatible antenna) for wireless communication with the wireless network, as well as a transmitter and/or receiver (e.g., a transceiver) for modulating, demodulating, transmitting, and/or receiving information to/from the antenna. All data transmitted to communication network 103 may be sent from controller 201 through the transmitter of network interface 207, and all data received from communication network 103 may be received by controller 201 via the receiver of network interface 207.

Various illustrative operations of the equipment described above will now be described. In the following illustrative description, it will be assumed that terminals 101 are 102 are each configured as a phone, that communication network 103 includes a phone network, and that a bi-directional audio phone call is made between terminal 101 and terminal 102. However, implementations of the various aspects disclosed herein are not limited to phones and phone calls. As will be described, audio provided by the party at terminal 101 and/or received from terminal 102 during a normal phone call may be used as a source for speech training data, which may be used for training a voice conversion model. This collection of speech training data may be done in a transparent manner from the user's perspective, without necessarily requiring a dedicated speech training data collection mode. Because speech training data may be collected in real time during a phone call, this may provide a desire for new ways to store and process the speech training data as opposed to environments where speech training data is collected in a dedicated collection mode without real time constraints. Storage of speech training data may be challenging in this transparent collection environment because a very large amount of data (e.g., representing the voices occurring during the phone call) may be provided, whereas storage 202 may have a limited capacity in practice, especially in a mobile device where device cost and size may be important considerations. As will be described below, only a relatively small selected subset of the data may be stored yet still provide for a high quality set of speech training data for the voice conversion model.

Speech training data collection may be broadly divided into two main functions: collection and processing of raw speech input into speech training data, and selection of a subset of the speech training data and storage thereof. These main functions may operate in a pipeline fashion (e.g., collection and processing, then selection/storage) and thus may also operate simultaneously with each other. In addition, either or both of these functions may operate before, during, or after a phone call as appropriate, and either or both of these functions may operate transparently behind the scenes from the perspective of the user.

Raw Speech Input Collection and Processing

Figure 3:
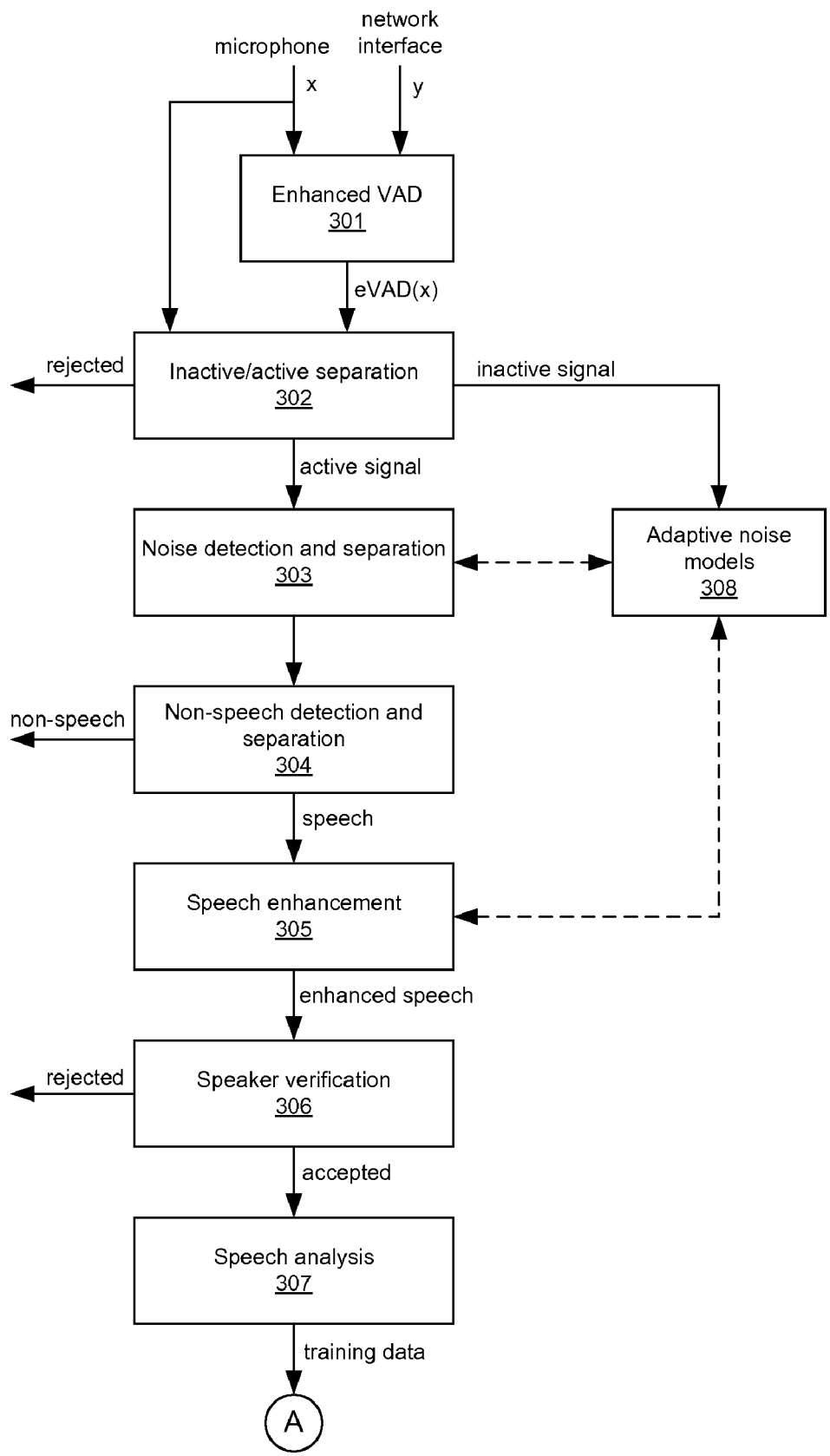
FIG. 3 is an illustrative flow chart showing steps for collecting speech conversion training data.

FIG. 3 shows illustrative steps that may be performed for collecting and processing raw speech input. Steps 301-308 are shown in a particular order, however they may be performed in a different order, and one or more of the steps may be skipped, further divided, or combined as desired. Steps 301-308 may all be performed by, e.g., controller 201 of terminal 101. However, in the alternative one or more of steps 301-308 may be performed externally to terminal 101, such as by a computer in communication network 103, in which case any inputs to and outputs from such a step may be sent and received via network interface 207. In the described example, the speech input may be provided during a phone call between both a party X at terminal 101 (speech input x) and a party Y at terminal 102 (speech input y) as received at terminal 101 via communication network 103. The paths of these speech inputs x, y are shown in FIG. 1.

Referring to FIG. 3, speech input x may be received by microphone 203 of terminal 101, and speech input y may be received by terminal 101 via network interface 207 and optionally output to speaker 204. Both speech inputs x and y may be received by an enhanced voice activity detector (VAD) function in step 301, which may be implemented by controller 201. VAD is a known function in voice-sensitive devices, and generally serves to separate active speech input from inactive input (e.g., silence). However, VAD has conventionally assumed only a single speech input. In this case, it may be desirable to determine whether only one of speech inputs x and y is active or inactive. In the present example, it will be assumed that it is desirable to determine whether speech input x (i.e., the voice from the party at terminal 101) is active or inactive. Active speech input x will be eligible for being part of the stored speech training data, whereas inactive speech input x will not.

An enhanced two-input VAD may be implemented in an innovative way b using dialogue modeling by exploiting the fact that while one party is speaking during a phone call, the other party is most likely listening but not speaking. For example, when the two parties X and Y are engaged in a phone call, the dialogue has four possible cases: (1) X is speaking, (2) Y is speaking, (3) both X and Y are speaking, and (4) neither X nor Y are speaking. It may be assumed that case (3) is the least likely and in any event may produce low quality speech input.

A conventional VAD function for a single channel x typically operates as follows:

$$VAD(x) = \begin{cases} 0, & x \text{ is silent} \\ 1, & x \text{ is speech} \\ 0 < \alpha < 1, & \text{otherwise, soft decision} \end{cases} \quad (1)$$

The conventional VAD(x) function includes one or more thresholds. The stricter the thresholds, the less likely that a given portion of speech input x will be considered active speech input. The single-channel VAD function may be adapted to operate for both channels x and y and enhanced taking the above dialogue modeling into consideration. This two-channel enhanced VAD (eVAD) may be expressed as:

$$eVAD(x) \Leftarrow [(1-VAD(y)] \cdot VAD(x)$$

$$eVAD(y) \Leftarrow [(1-VAD(x)] \cdot VAD(y). \quad (2)$$

Figure 4:
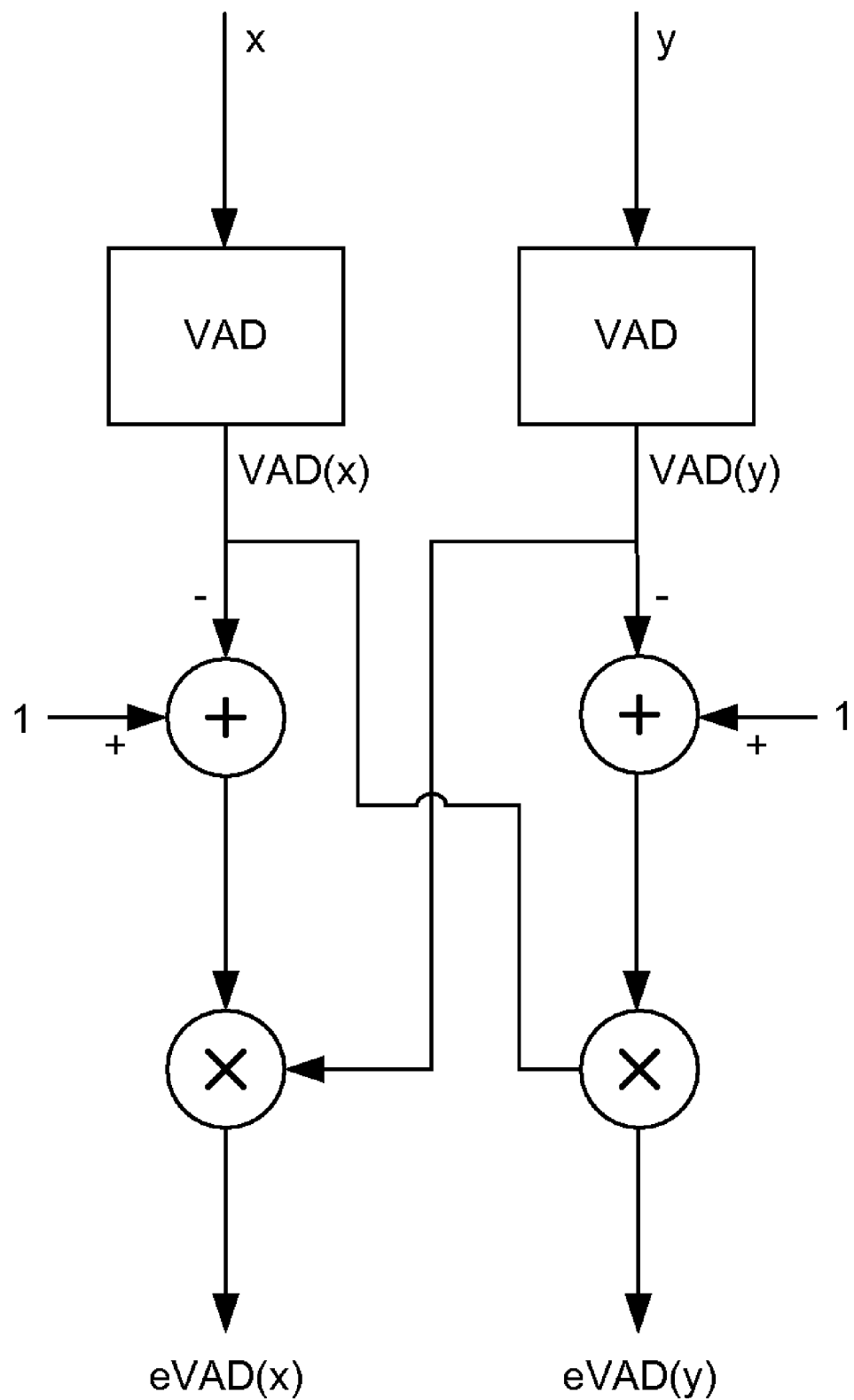
FIG. 4 is an illustrative functional block diagram of a two-party voice activity detector.

An illustrative functional block diagram representation of Equation 2 is shown in FIG. 4.

Because a large quantity of source speech input x and y may be provided during a typical phone call, the VAD thresholds may be set rather strictly to provide for higher quality potential speech training data yet still maintain a sufficient quantity of qualified speech training data. In fact, because the total amount of speech input may be expected to be very large, over-rejection of speech input may likely not be harmful and may be beneficial from the viewpoint of data quality.

Referring again to FIG. 3, step 301 therefore produces a signal eVAD(x) as described above. In step 302, an inactive/active separation function (which may be implemented by controller 201) receives eVAD(x) and correlate it with speech input x in a known manner to detect and segment silence from the active speech signal. In the particular embodiment shown, in step 301, eVAD(x)=1 means that the corresponding portion of speech input x is active, and eVAD(x)=0 means that the corresponding portion of speech input x is inactive. An eVAD value between zero and one results in a soft decision in step 302. The results of step 302 may be provided as physically or logically (e.g., multiplexed) separate outputs of the active portions of speech input x and the inactive portions of speech input x.

In step 303, the active speech input signal may be received and noise may be separated out. To accomplish this, inactive speech signal may be received in step 308. This inactive speech signal may be analyzed and used for determining various statistical characteristics of noise levels during silent portions of the inactive speech input signal. These characteristics may be applied in a known manner to remove noise from the active speech input signal at step 303. In addition, signal level normalization may be performed in step 303. Both steps 303 and 308 may be performed by controller 201.

In step 304, human-generated non-speech is detected and removed. Examples of such non-speech include laughing, breathing, and hesitation sounds (e.g., "ummmm"). This function may have already been performed as part of step 302, and in that case step 304 may be skipped.

In step 305, the speech signal may be enhanced in any manner desired. For example, one or more perceptual aspects of the speech signal may be improved, such as correcting potential reverberations (e.g., echo) in the speech signal.

In step 306, a speaker verification algorithm may be applied to verify the identity of the person who is speaking to ensure that the speech training data is taken only from the appropriate intended person. This may be performed by comparing speech input x with a hypothesized speaker verification model trained on the reference speech data stored in storage 202. Such speaker verification techniques are known, for example as described in F. Bimbot, et al., "A tutorial on text-independent speaker verification," EURASIP Journal on Applied Signal Processing, 2004:4, pp. 430-451. This reference speech data may have been previously collected under controlled circumstances such that there is confidence that the reference speech data is from a known person. For instance, where terminal 101 is a cell phone, the reference speech data may be automatically collected during the first phone call or in response to a user-selection of a reference speech data collection mode (e.g., by providing appropriate input via user input portion 205. Because communication devices such as cell phones are usually dedicated for personal usage by the owner, who will be the one most likely to be talking into the phone, it may be expected to be relatively easy to obtain the owner's speech for purposes of generating reference speech data. The speaker verification process, including the collection and generation of reference speech data and the training of the verification model, may be performed by controller 201.

Next, in step 307, enhanced speech input x may be analyzed as desired and represented in the domain (e.g., a parametric domain) in which voice conversion will be performed. For instance, the speech may be represented (e.g., compressed) using a parametric speech model. Such a parametric model may use parameters defined as a sequence of feature vectors that change over time, and may allow for easy manipulation of individual parameters such as spectrum and/or prosodic features. Step 307 may be performed by controller 201. An example of such analysis and representation is described in U.S. patent application Ser. No. 11/107,344, filed Apr. 15, 2005, which is incorporated by reference herein as to its entirety. The resulting speech training data may be included in the training corpus, subject to the optional data storage process described next, which is used to train the voice conversion model.

Speech Training Data Selection and Storage

Figure 5:
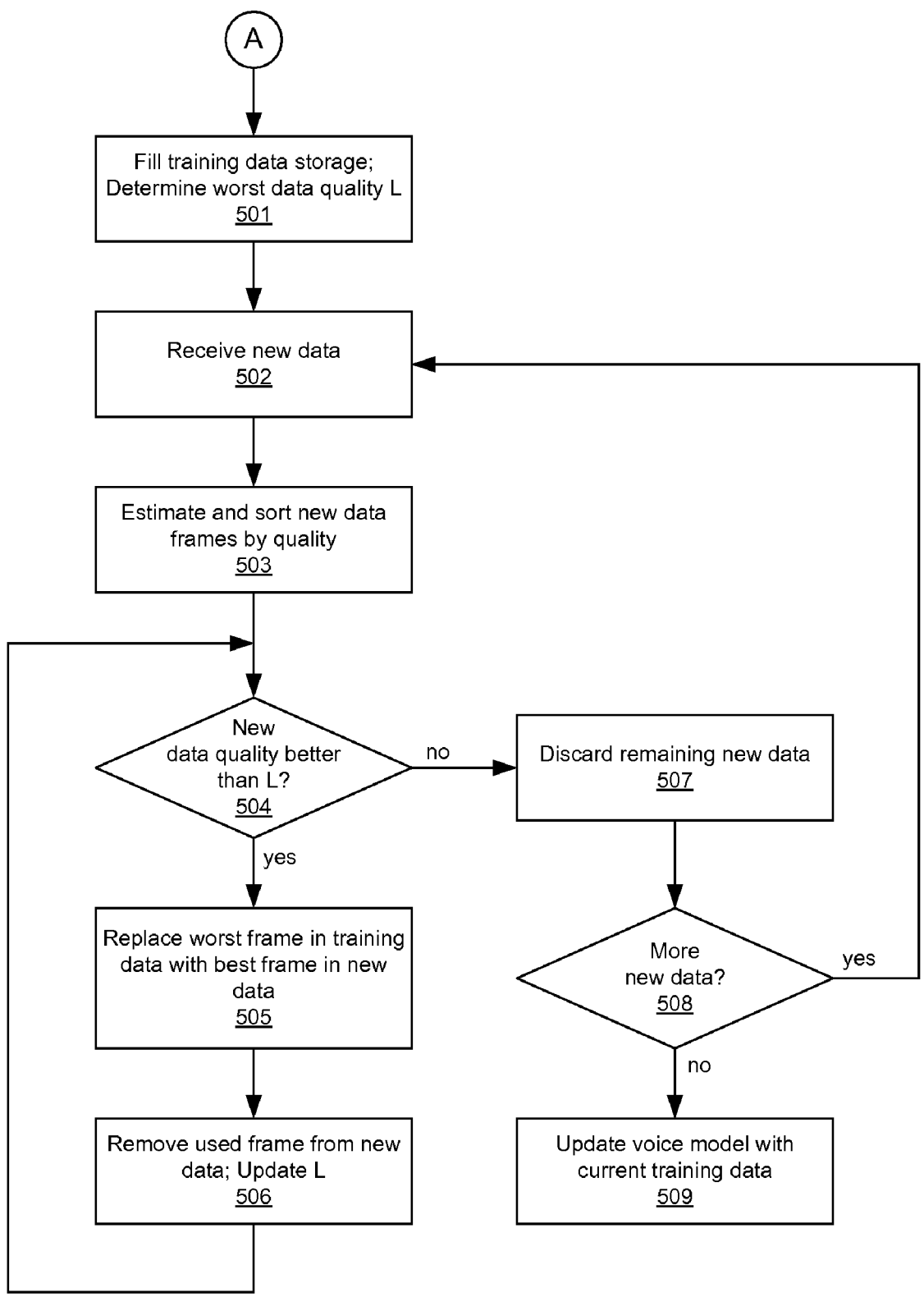
FIG. 5 is an illustrative flow chart showing steps for increasing the quality of existing speech conversion training data.

While it is generally true that, the more speech training data available to a voice conversion model, the more accurate the voice conversion model (provided that the data is of high quality), it may not be expected to be practical to store all of the incoming speech training data generated from step 307. Accordingly, it may be necessary to selectively choose which portions of the speech data are stored for voice conversion model training and which are not. FIG. 5 is a continuation of the process of FIG. 4 and shows illustrative steps that may be performed to manage incoming speech training data in this manner. Steps 501-509 are shown in a particular order, however they may be performed in a different order, and one or more of the steps may be skipped, further divided, or combined as desired. Any or all of the steps of FIG. 5 may be performed by controller 201.

In step 501, an initial amount of storage is allowed to be filled with incoming speech training data from step 307, such as in storage 202. This amount may be a fixed predetermined amount or may be dynamically determined based on an available amount of storage. Moreover, this amount may be set to be between (inclusively or non-inclusively) a lower storage amount limit and an upper storage amount limit. The lower storage amount limit may be set to correspond to a minimum amount of speech training data that would be acceptable for a high quality voice conversion model. The upper storage amount limit may be set in accordance with an available amount of storage space.

The speech training data may be subdivided into arbitrary units, which will be referred to herein as frames. The frames may or may not have a header and may be of a fixed size or a variable size. An example of stored speech training data and new incoming speech training data is shown in FIG. 6, where each has eight frames. In practice, the speech training data may have more (e.g., thousands) or less frames than eight. Each frame may include a plurality of bits of data.

Once the initial amount of storage space is filled, controller 201 may stop collection of further speech training data. Alternatively, controller 201 may continue collection and storage of further speech training data, albeit only selected portions thereof. In the latter case, controller 201 may determine the quality L of the worst quality frame. For instance, controller 201 may determine the quality of each frame in the stored speech training data and then choose the worst quality L from those determined qualities. In FIG. 6, the quality of each frame of the stored data is shown on a scale of one to five. For example, frame #1 has a quality of one, frame #2 has a quality of three, and frame #s 3 and 4 each has a quality of two. The worst quality L of the existing speech training data shown in FIG. 6 is one (frame #s 1 and 7). In addition, it can be seen that the further/new speech training data also has a quality associated with each frame. For example, the quality of frame #1 of the new speech training data is three, and the quality of frame #2 is two.

The qualities shown, as well as the one-to-five scale, are merely illustrative. Any measure and scale of quality may be used. For example, the quality may depend upon the signal-to-noise ratio of the data, one or more of the parameters in the parametric model of the speech signal, and/or the measured modeling error caused by parametric representation (since if the quality of the signal is lower, the modeling error may be expected to be higher). Additionally or alternatively, a combination of several quality measures may be used to define the overall quality. The perceived quality of a particular portion of data may also depend upon the data as a whole. For instance, the quality of a data portion may be adjusted to be higher where the data portion provides speech aspects missing from or otherwise needed in the data as a whole (e.g., certain phonemes).

Next, in step 502, controller 201 receives/generates the new speech training data shown in FIG. 6. This new speech training data may also be received by storage 202 and stored temporarily therein. In step 503, controller 201 determines the quality of each frame in the new speech training data, and optionally also sorts the new speech training data by quality. An example of this sorting is shown in FIG. 7. In this case, the new speech training data is sorted from best quality (four) to worst quality (one), however the sorting may alternatively be in the opposite direction.

Next, in step 504, controller 201 determines whether the best quality of the new speech training data frames (in this example, four) is better than the worst quality of the existing speech training data frames (in this example, one). In this case, four is better than one, and so the outcome it true. Thus, the process moves on to step 505, in which controller 201 replaces a worst quality frame of the existing speech training data with a best quality frame of the new speech training data. This is shown in FIG. 7 by way of an arrow, showing that frame #1 of the new speech training data replaces frame #1 of the existing speech training data. An alternative would have been to replace frame #7 of the existing speech training data, which also has a worst quality of one.

Then, in step 506, controller 201 discards (e.g., ignores or deletes, as indicated by an "X" in FIG. 8) the frame of the new speech training data that was used as the replacement, updates the value of L based on the revised existing speech training data, and repeats steps 504, 505, and 506 until the outcome of step 504 is false. Thus, in the present example, frame #2 of the new speech training data replaces frame #7 of the existing speech training data (as shown in FIG. 8), and then frame #3 of the new speech training data replaces frame #3 of the existing speech training data (as shown in FIG. 9). In this way, the average quality of the existing speech training data set may be improved, as shown in FIG. 10. For instance, in the present example, by performing steps 504-506, the average quality of the existing speech training data set increased from 2.8 ((1+3+2+2+5+4+1+4)/8) to 3.6 ((4+3+3+2+5+4+4+4)/8).

Upon the outcome of step 504 being false, then controller 201 discards the remaining frames of the new speech training data (step 507) and determines whether any more new speech training data exists (step 508). If so, then the process moves back to step 502. If not, then the data collection process ends and the revised speech training data may be used by controller 201 to train the voice conversion model using known processes (step 509). The voice conversion model may then be used by controller 201 to generate a synthesized target voice from a source voice. The synthesized voice may be output by controller 201 via, for example, speaker 204.

In addition to, or as an alternative to, the process shown in FIG. 5, low-quality frames may be discarded from the existing speech training data to increase the overall data quality, but without being replaced by new higher quality frames, while still maintaining sufficient speech training data for an accurate voice conversion model. For instance, a lowest quality frame of the existing speech training data may be determined, and that lowest quality frame may be discarded. This may be repeated until the lower storage amount limit is reached.

Moreover, the processes of FIGS. 3 and 5 may be performed automatically in the background with or without the user's knowledge. When a sufficient amount of speech training data has been stored for the voice conversion model (e.g., when the user is happy with the voice conversion model results), then the user may decide to turn off the processes of FIGS. 3 and 5 and only use the existing speech training data.

In addition, it may be the case that the user does not want to listen to his or her own voice from the voice conversion model. Instead, the user may prefer to listen to the voice of someone else, such as the user's spouse. In that case, users may be able to share stored speech training data and/or trained voice data models. This may be accomplished by transmitting the model parameters between two devices (e.g., from terminal 101 to terminal 102, or vice versa) via, for example, communication network 103.

It is also noted that, while the above examples have been described with regard to processing speech input x and generating speech training data from speech input x, the same processes may be equally applied to speech input y (e.g., applied to speech input received from network interface 207. Where this is done, such processing of speech input y may further be used to estimate the identity of the source of speech input y (i.e., the identity of the person doing the speaking). Through interaction with user input and output portions 205 and 206, controller 201 may give the user the opportunity to reject an incoming call based on the determined caller identity. Where it is illegal or otherwise undesirable to perform this analysis on speech input y (since it is from another party and might be used without the other party's knowledge), it may be desirable that controller 201 provide the user with an option, via user input and output portions 205 and 206, to completely ignore speech input y or only use speech input y for implementing the step 301 eVAD function.

It may further be desirable that processing of speech input x may be used to determine whether the person speaking is authorized to use terminal 101. This may be enhanced in conjunction with additional user identification data, such as image data from a camera coupled to controller 201, or a fingerprint reader coupled to controller 201, or a password entered via user input portion 205.

CONCLUSION

Thus, various ways to collect and process high quality speech training data without undue burden to the user have been described, by collecting and processing such data during normal usage of a device, such as during a normal bi-directional phone call using a phone device. In this way, the collection of speech training data may be effectively transparent to the user.

What is claimed is:
1. A method, comprising:
receiving first speech input by a first party and second speech input by a second party;
determining, by a computer, whether portions of the first speech input are active based on both the first speech input and the second speech input;
generating data representing the active portions of the first speech input, wherein the data includes first data repre- senting a first portion of the first speech input and second data representing a second portion of the first speech input;

comparing the quality of the first data with the quality of the second data;

replacing a first portion of the stored first data with a first portion of the second data responsive to the quality of the second data being higher than the quality of the first data; and storing the data.

2. The method of claim 1, further comprising training a voice conversion model based on the data.

3. The method of claim 2, further including generating a synthesized voice based on the voice conversion model.

4. The method of claim 1, further comprising:

after replacing the first portion of the stored first data, comparing a modified quality of the first data with a modified quality of the second data; and replacing a second portion of the stored first data with a second portion of the second data responsive to the modified quality of the second data being higher than the modified quality of the first data.

5. The method of claim 1, further comprising discarding the second data responsive to the quality of the first data being at least as high as the quality of the second data.

6. The method of claim 1, further comprising:

determining the quality of the first data as a quality of a worst-quality portion of the first data; and determining the quality of the first data as a quality of a highest-quality portion of the second data.

7. The method of claim 6, wherein the first portion of the first data is the worst-quality portion of the first data and the first portion of the second data is the highest-quality portion of the second data.

8. The method of claim 1, wherein determining further comprises:

determining whether portions of the second speech input are active; and for each portion of the first speech input, determining that the portion of the first speech input is inactive if it is simultaneous with one of the active portions of the second speech input.

9. The method of claim 8, wherein determining whether portions of the first speech input are active further comprises:

for each portion of the first speech input, determining that the portion of the first speech input is active only if it is not simultaneous with one of the active portions of the second speech input.

10. The method of claim 9, wherein determining whether portions of the first speech input are active further comprises:

for each portion of the first speech input not simultaneous with an active portion of the second speech input, comparing a characteristic of the portion of the first speech input with a threshold, and determining that the portion of the first speech input is inactive if the characteristic does not exceed the threshold.

11. An apparatus, comprising:

a first input configured to receive first speech input;

a second input configured to receive second speech input different from the first speech input;

a computer-readable medium; and a controller coupled to the first and second inputs and the computer-readable medium, the controller being configured to:

determine whether portions of the first speech input are active based on both the first speech input and the second speech input, generate data representing the active portions of the first speech input, wherein the data includes first data representing a first portion of the first speech input and second data representing a second portion of the first speech input, compare the quality of the first data with the quality of the second data, replace a first portion of the stored first data with a first portion of the second data responsive to the quality of the second data being higher than the quality of the first data, and store the data at the computer-readable medium.

12. The apparatus of claim 11, further comprising:

a microphone coupled to the controller; and a network interface coupled to the controller, wherein the first input is configured to receive the first speech input from the microphone and the second input is configured to receive the second speech input from the network interface.

13. The apparatus of claim 12, wherein the network interface comprises an antenna, and wherein the network interface is configured to wirelessly receive a signal representing the second speech input via the antenna.

14. The apparatus of claim 12, further comprising a speaker coupled to the controller, wherein the controller is configured to cause the speaker to emit sound based on the second speech input while the second speech input is being received.

15. The apparatus of claim 11, wherein the controller is further configured to:

replace the first portion of the stored first data, compare a modified quality of the first data with a modified quality of the second data, and replace a second portion of the stored first data with a second portion of the second data responsive to the modified quality of the second data being higher than the modified quality of the first data.

16. The apparatus of claim 11, wherein the controller is further configured to discard the second data responsive to the quality of the first data being at least as high as the quality of the second data.

17. The apparatus of claim 11, wherein the controller is further configured to:

determine the quality of the first data as a quality of a worst-quality portion of the first data, determine the quality of the first data as a quality of a highest-quality portion of the second data.

18. The apparatus of claim 17, wherein the first portion of the first data is the worst-quality portion of the first data and the first portion of the second data is the highest-quality portion of the second data.

19. The apparatus of claim 11, wherein the controller is further configured to:

determine whether portions of the second speech input are active, and for each portion of the first speech input, determine that the portion of the first speech input is inactive if it is simultaneous with one of the active portions of the second speech input.

20. The apparatus of claim 19, wherein the controller is further configured to:

for each portion of the first speech input, determine that the portion of the first speech input is active only if it is not simultaneous with one of the active portions of the second speech input.

21. The apparatus of claim 20, wherein the controller is further configured to:

for each portion of the first speech input not simultaneous with an active portion of the second speech input, compare a characteristic of the portion of the first speech input with a threshold, and determine that the portion of the first speech input is inactive if the characteristic does not exceed the threshold.

22. An apparatus, comprising:

means for receiving first speech input by a first party and second speech input by a second party;

means for determining whether portions of the first speech input are active based on both the first speech input and the second speech input;

means for generating data representing the active portions of the first speech input, wherein the data includes first data representing a first portion of the first speech input and second data representing a second portion of the first speech input;

means for comparing the quality of the first data with the quality of the second data; and means for replacing a first portion of the stored first data with a first portion of the second data responsive to the quality of the second data being higher than the quality of the first data.

* * * * *